United States Patent
Baldassara et al.

(10) Patent No.: US 9,676,231 B2
(45) Date of Patent: Jun. 13, 2017

(54) AIRCRAFT WHEEL RIM WITH REMOVABLE FLANGE

(71) Applicant: MESSIER-BUGATTI-DOWTY, Velizy-Villacoublay (FR)

(72) Inventors: Patrick Baldassara, Velizy-Villacoublay (FR); Xavier Delayre, Velizy-Villacoublay (FR); Martial Galland, Velizy-Villacoublay (FR)

(73) Assignee: MESSIER-BUGATTI-DOWTY, Velizy-Villacoublay (FR)

( * ) Notice: Subject to any disclaimer, the term of this patent is extended or adjusted under 35 U.S.C. 154(b) by 0 days.

(21) Appl. No.: 14/572,879

(22) Filed: Dec. 17, 2014

(65) Prior Publication Data
US 2015/0183268 A1 Jul. 2, 2015

(30) Foreign Application Priority Data

Dec. 31, 2013 (FR) ..................... 13 63744

(51) Int. Cl.
*B60B 25/00* (2006.01)
*B60B 23/08* (2006.01)
*B60B 25/20* (2006.01)
*B60B 21/10* (2006.01)
(Continued)

(52) U.S. Cl.
CPC ............ *B60B 23/08* (2013.01); *B60B 21/104* (2013.01); *B60B 25/20* (2013.01); *B60B 25/08* (2013.01); *B60B 25/12* (2013.01); *B60B 2900/113* (2013.01); *B60B 2900/1214* (2013.01); *B60B 2900/212* (2013.01); *B60B 2900/531* (2013.01);
(Continued)

(58) Field of Classification Search
CPC ........ B60B 23/08; B60B 23/00; B60B 21/104
USPC .................... 301/13.1, 11.2, 30.2, 35.3, 36.1
See application file for complete search history.

(56) References Cited

U.S. PATENT DOCUMENTS

| 1,365,555 A | 1/1921 | Sieven |
| 2,871,987 A * | 2/1959 | Du Bois ................. F16D 55/40 188/18 A |
| 3,529,869 A | 9/1970 | Casey |

(Continued)

FOREIGN PATENT DOCUMENTS

GB        191103544 A    5/1911

OTHER PUBLICATIONS

French Search Report, FR 1363744, Sep. 15, 2014, France.

*Primary Examiner* — Hau Phan
(74) *Attorney, Agent, or Firm* — Sughrue Mion, PLLC

(57) ABSTRACT

Aircraft wheel rim in two parts, one of them a main part (1) comprising a hub (2), a disc (4) extending between the hub and an annular external portion (3) intended to accept a tire and shaped to have a flange (5) at one of its ends. The other end is shaped to accept the second part, a removable part (10) forming a flange (12) which removable part is attached to the annular external portion after the tire has been fitted. The rim has a structure for preventing the removable flange from rotating relative to the rim. The structure comprises at least one link (20) having ends, the centers of which define an axis which extends in a plane perpendicular to an axis of rotation of the rim while at the same time extending obliquely to make an angle ($\beta$) with respect to a radial direction, one of the ends being coupled to the main part and the other of its ends being coupled to the removable part.

5 Claims, 2 Drawing Sheets

(51) Int. Cl.
  *B60B 25/08*    (2006.01)
  *B60B 25/12*    (2006.01)
(52) U.S. Cl.
  CPC ..... *B60B 2900/541* (2013.01); *B60Y 2200/51* (2013.01)

(56) References Cited

U.S. PATENT DOCUMENTS

| | | | | |
|---|---|---|---|---|
| 4,046,184 | A * | 9/1977 | Diehl | B60B 25/06 301/30.2 |
| 4,683,930 | A * | 8/1987 | Elam | B60B 25/18 301/35.3 |
| 5,086,821 | A * | 2/1992 | Russell | B60B 25/18 152/409 |
| 5,862,890 | A * | 1/1999 | Long | F16D 55/36 188/71.5 |
| 6,786,259 | B2 * | 9/2004 | Vehar | B60B 25/18 152/410 |
| 8,668,276 | B2 * | 3/2014 | Hall | B64C 25/36 301/6.1 |

* cited by examiner

AIRCRAFT WHEEL RIM WITH REMOVABLE FLANGE

BACKGROUND OF THE INVENTION

Wheel rims intended to accept a tyre and comprising two flanges one of which is removable are already known. This type of rim comprises an external portion with symmetry of revolution bearing a first flange formed as an integral part of the rim and a removable second flange which is attached to the external portion and held in position by a ring immobilized by a wedge. The layout of this type of rim allows a tyre to be fitted by slipping this tyre around the external portion and then mounting the removable flange on the rim so as to trap the two beads of the tyre between the flanges of the rim. The structure of the rim thus allows the tyre to be fitted and removed while the rim is fixed to an axle, such as an aircraft landing gear axle.

It has been identified that there is a risk of the removable flange rotating relative to the rest of the rim, which may cause damage to the interface between the two elements, leading to loss of performance. In order to reduce this risk, document FR2976216 proposes the use of a particular ring able to develop radial force preventing the removable flange from rotating. It has also been proposed for the flange and the rest of the rim to be made to collaborate on a non-circular bearing surface, thus preventing the removable flange from rotating. It has also been proposed, in document FR2966078 for the removable flange to be provided with teeth, angular immobilization being obtained by inserting a wedge in the space between two teeth.

These forms of angular immobilization, aside from being limited in terms of mechanical strength, are expensive to produce and difficult for an operator to check.

SUBJECT OF THE INVENTION

The subject of the invention is a rim with a removable flange, in which the device that prevents the removable flange from rotating is simple and easy to check.

Presentation of the Invention

In order to achieve this objective, there is proposed an aircraft wheel rim in two parts, one of which is a main part comprising a hub, a disc extending between the hub and an annular external portion intended to accept a tyre and shaped to have a flange at one of its ends, the other of its ends being shaped to accept a removable part forming a flange which removable part is attached to the annular external portion after the tyre has been fitted, the rim comprising means for preventing the removable flange from rotating relative to the rim. According to the invention, the rotation-prevention means comprise at least one link having a first end coupled to the main part and a second end coupled to the removable part, the ends having centres which define an axis which extends in a plane perpendicular to an axis of rotation of the rim while at the same time extending obliquely to make an angle with respect to a radial direction.

Thus, the removable flange and the main part of the rim can collaborate on annular surfaces that are very simple to produce, while the rotation-proofing is obtained by the interposition of a link which remains highly visible from the outside, making the rim easier to inspect.

BRIEF DESCRIPTION OF THE DRAWINGS

The invention will be better understood in the light of the description which follows of some particular embodiments of the invention, with reference to the figures of the attached drawings, among which.

DETAILED DESCRIPTION OF PARTICULAR EMBODIMENTS OF THE INVENTION

Figure 1:
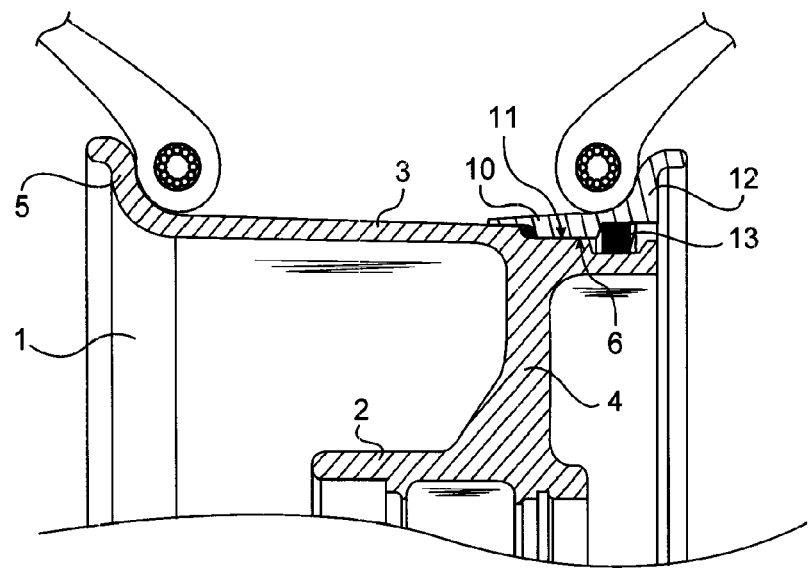
FIG. 1 is a view in section of a rim with removable flange according to a first particular embodiment of the invention.

With reference to FIG. 1, the invention applies to rims comprising a main part 1 which comprises a hub 2 suited to accepting the rolling bearings (not depicted) that guide rotation about an axis of rotation X, and an external annular portion 3 connected to the hub 2 by a disc 4. One of the axial ends of the external annular portion 3 is shaped into a flange 5 while the other end is shaped as a centring surface 6 for centring a removable auxiliary part 10 of annular overall shape which has a centring surface 11 and an end shaped as a flange 12. In this instance, the centring surfaces 6 and 11 have symmetry of revolution. In a way known per se, the removable auxiliary part 10 is attached to the main part 1 after a tyre has been fitted on the external annular portion 3, as depicted. A ring 13 is then interposed between the main part 1 and the removable auxiliary part 10 in order to join these two parts together axially.

Figure 2:
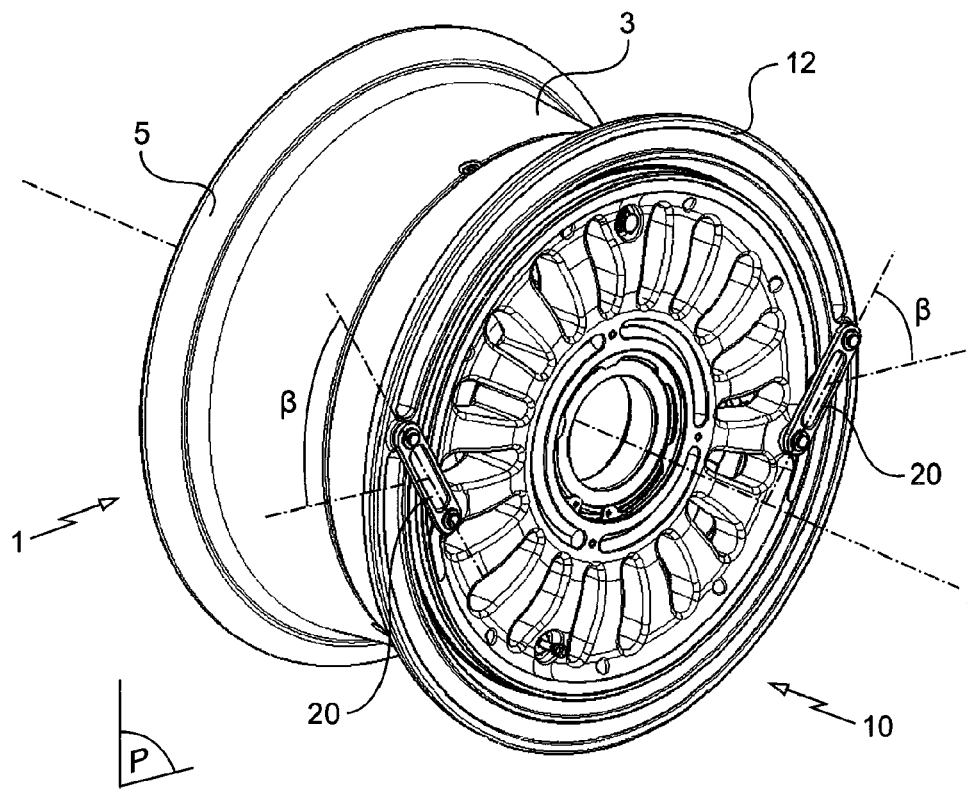
FIG. 2 is a perspective view of the rim of FIG. 1.
Figure 3:
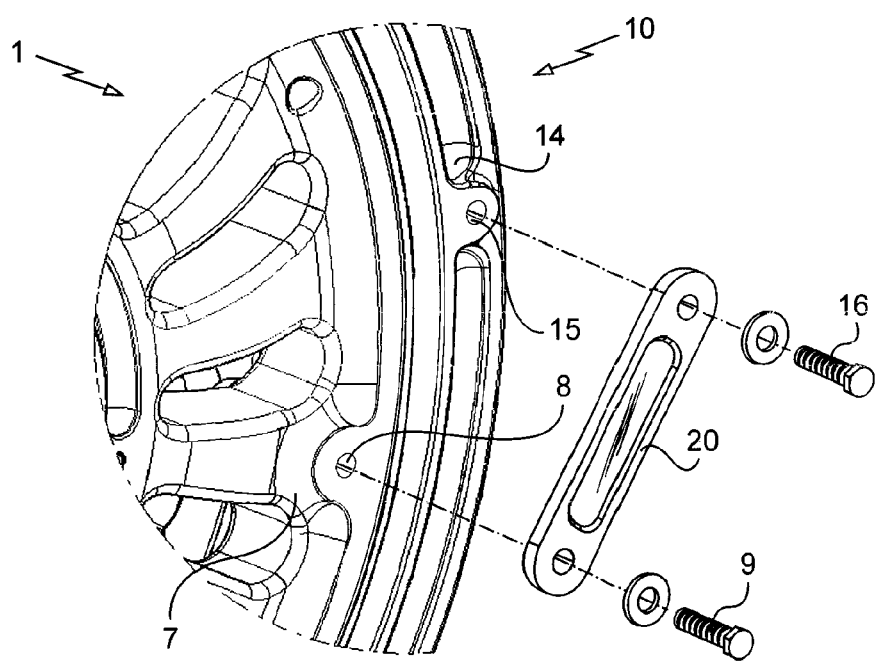
FIG. 3 is an exploded detailed view of the rim of FIG. 2.

According to the invention, and as can be seen in FIGS. 2 and 3, the main part 1 comprises reservations 7 in each of which an orifice 8 has been formed in an axial direction. Likewise, the removable flange 10 comprises reservations 14 in each of which an orifice 15 has been formed in an axial direction. The adjacent orifices 7, 14 accept fasteners 9 and 16 for fastening the ends of a link 20. In this instance, each of the links 20 has been cut from flat metal bar stock.

The axis defined by the centres of the ends of the link 20 extends in this instance substantially in a plane P perpendicular to the axis X, and in a direction making a non-zero angle $\beta$ with respect to a radial direction. For preference, the angle $\beta$ is comprised between 45 and 90 degrees. Laid out in this way, each link 20 acts as an impediment to rotation of the removable flange 10 on the main part 11 and is perfectly visible from the outside, so that its presence can be checked more easily.

The rim here is equipped with two links 20 mounted in diametrically opposite regions, and making opposite angles with radial directions.

Figure 4:
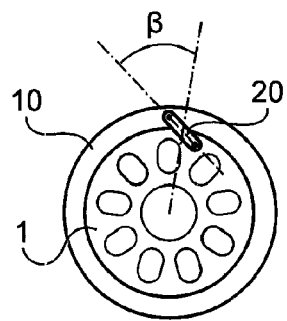
FIGS. 4 to 7 are schematic diagrams illustrating various embodiments of the invention.
Figure 5:
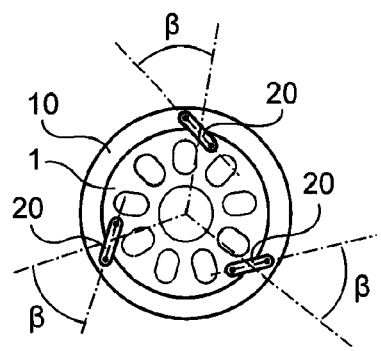
Figure 6:
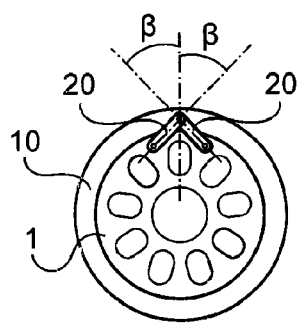
Figure 7:
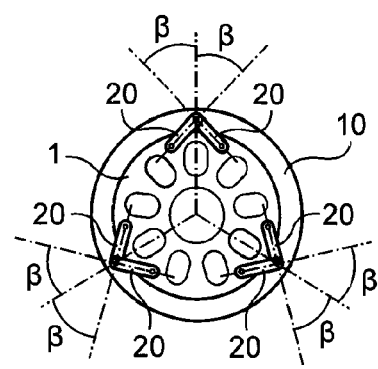

FIGS. 4 to 7 show alternative forms of embodiment of the invention. In FIG. 4, the rim is fitted with just one link 20. In FIG. 5, the rim is fitted with three links 20 uniformly distributed and all making the same angle $\beta$ with respect to radical directions. In FIG. 6, the rim comprises two links 20 which converge via their ends connected to the removable auxiliary part 10, being associated with a fastener in common. In FIG. 7, the pattern involving two convergent links from FIG. 6 has been repeated three times.

The invention is not restricted to that which has just been described but on the contrary encompasses any alternative form that falls within the scope defined by the claims.

The invention claimed is:

1. An aircraft wheel rim having an axis of rotation that defines a radial direction extending therefrom and comprising:

a main part (1) and an auxiliary removable part (10), said main part comprising a hub (2), a disc (4) extending between the hub and an annular external portion (3) intended to accept a tyre, said annular external portion being shaped to have a first flange (5) at a first end thereof and a second flange (12) at a second end thereof, said second end being shaped to accept said auxiliary removable part (10), said removable part being attached to the annular external portion after the tyre has been fitted, and rotation-prevention link-based structure for preventing the removable flange from rotating relative to the rim, wherein the rotation-prevention link-based structure comprises at least one longitudinally-shaped link (20) having a first distal end coupled to the main part and a second distal end coupled to the auxiliary removable part, the first and second distal ends of the link having centres which define a longitudinal axis which extends in a plane perpendicular to the axis of rotation of the rim while at the same time extending obliquely to make an angle ($\beta$) with respect to the radial direction.

2. The aircraft wheel rim according to claim 1, in which the main part and the removable auxiliary part comprise reservations (7,14) in which there are formed orifices (8,15) suited to accepting fasteners (9,16) for securing the distal ends of the link.

3. The aircraft wheel rim according to claim 1, comprising at least two longitudinally-shaped links (20) arranged to be at opposite angles with respect to radial directions.

4. The aircraft wheel rim according to claim 3, in which the two longitudinally-shaped links (20) are mounted in diametrically opposite regions of the rim.

5. The aircraft wheel rim according to claim 1, in which the at least one longitudinally-shaped link (20) is cut from flat metal bar stock.

* * * * *